United States Patent
Li et al.

(10) Patent No.: US 8,146,351 B2
(45) Date of Patent: Apr. 3, 2012

(54) REGENERATION SYSTEMS AND METHODS FOR PARTICULATE FILTERS USING VIRTUAL BRICK TEMPERATURE SENSORS

(75) Inventors: Jianwen Li, Canton, MI (US); Michael Christopher Luckham, Highland, MI (US); Paul Jasinkiewicz, Northville, MI (US); Rebecca J Darr, Milford, MI (US); Rahul Mital, Rochester Hills, MI (US)

(73) Assignee: GM Global Technology Operations LLC

( * ) Notice: Subject to any disclaimer, the term of this patent is extended or adjusted under 35 U.S.C. 154(b) by 417 days.

(21) Appl. No.: 12/479,028

(22) Filed: Jun. 5, 2009

(65) Prior Publication Data

US 2010/0307139 A1  Dec. 9, 2010

(51) Int. Cl.
*F01N 3/00* (2006.01)

(52) U.S. Cl. ........... 60/295; 60/274; 60/277; 60/286; 60/299

(58) Field of Classification Search ............ 60/274, 60/284–287, 295–301
See application file for complete search history.

(56) References Cited

U.S. PATENT DOCUMENTS

| | | | | |
|---|---|---|---|---|
| 4,914,065 A * | 4/1990 | Hijikata et al. | ................. | 502/52 |
| 5,419,122 A * | 5/1995 | Tabe et al. | ...................... | 60/274 |
| 5,511,413 A * | 4/1996 | Pfister et al. | .............. | 73/114.69 |
| 6,176,896 B1 * | 1/2001 | Dementhon et al. | ............. | 95/14 |
| 7,054,734 B2 * | 5/2006 | Todoroki et al. | ............. | 701/105 |
| 7,159,391 B2 * | 1/2007 | Kogo et al. | ..................... | 60/297 |
| 7,243,491 B2 * | 7/2007 | Okugawa et al. | ............. | 60/311 |
| 7,293,410 B2 * | 11/2007 | Miura | ............................ | 60/295 |
| 7,337,607 B2 * | 3/2008 | Hou et al. | ...................... | 60/274 |
| 7,350,350 B2 * | 4/2008 | Okugawa et al. | ............. | 60/297 |
| 7,458,206 B2 * | 12/2008 | Yahata et al. | ................... | 60/297 |
| 7,730,718 B2 * | 6/2010 | Higuchi | ........................ | 60/285 |
| 2004/0123586 A1 | 7/2004 | Kuboshima et al. | | |
| 2005/0060992 A1 | 3/2005 | Kogo et al. | | |
| 2006/0016180 A1 * | 1/2006 | Tomita et al. | ................... | 60/297 |
| 2006/0096280 A1 * | 5/2006 | Zhan et al. | ..................... | 60/297 |
| 2008/0060347 A1 * | 3/2008 | Tominaga et al. | ............. | 60/284 |
| 2008/0155965 A1 * | 7/2008 | Henderson et al. | ............ | 60/286 |
| 2011/0214414 A1 * | 9/2011 | Gonze et al. | ................... | 60/276 |

FOREIGN PATENT DOCUMENTS

JP           2006118418 A  *  5/2006

* cited by examiner

*Primary Examiner* — Thomas Denion
*Assistant Examiner* — Jesse Bogue

(57) ABSTRACT

An exhaust control system includes a temperature sensor, a temperature estimation module, and an exhaust condition adjustment module. The temperature sensor measures an outlet temperature of an exhaust gas downstream from an emission reduction device. The temperature estimation module estimates a highest temperature of the emission reduction device. The exhaust condition adjustment module controls operation of the exhaust control system based on the highest temperature of the emission reduction device.

11 Claims, 3 Drawing Sheets

REGENERATION SYSTEMS AND METHODS FOR PARTICULATE FILTERS USING VIRTUAL BRICK TEMPERATURE SENSORS

FIELD

The present disclosure relates to exhaust systems for internal combustion engines, and more particularly to regeneration systems and methods for particulate filters by using virtual brick temperature sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may produce hydrocarbons (HC), nitrogen oxides (NO$_x$), and particulates. HC may be filtered by an oxidation catalyst. NO$_x$ emissions may be reduced by a selective catalytic reduction (SCR) system. The particulates may be filtered by a particulate filter. In some implementations, the particulate filter may include catalysts in the form of bricks that trap particulates therein. Over time, the particulate filter becomes full and needs to be regenerated to remove the particulates that are trapped in the catalysts of the particulate filter. During regeneration, heat is applied to the trapped particulates to combust the particulates within the particulate filter. After the particulates within the particulate filter are combusted, the particulate filter may resume filtering.

Catalysts of the particulate filter are subject to elevated temperatures during regeneration. Temperature of the particulate filter may not be uniform throughout the particulate filter. In addition to the heat from the exhaust gas, the particulate filter may be subject to exothermic heat released from an oxidizing reaction of HC in the oxidation catalyst that is provided upstream from the particulate filter. Moreover, regeneration of the particulate filter includes oxidizing soots or particulates trapped on surfaces of the catalyst bricks. Oxidizing the soots or particulates releases heat to the surfaces of the catalyst bricks.

Conventionally, exhaust gas temperature sensors are provided upstream and downstream from the particulate filter to monitor an upstream temperature and a downstream temperature of the exhaust gas, respectively. A temperature of the particulate filter may be based on an average of the upstream and downstream temperatures. Control of the regeneration may be based on the temperature of the particulate filter.

SUMMARY

An exhaust control system includes a temperature sensor, a temperature estimation module, and an exhaust condition adjustment module. The temperature sensor measures an outlet temperature of an exhaust gas downstream from an emission reduction device. The temperature estimation module estimates a highest temperature of the emission reduction device. The exhaust condition adjustment module controls operation of the exhaust control system based on the highest temperature of the emission reduction device.

A regeneration system includes a temperature sensor, a temperature estimation module, and an exhaust condition adjustment module. The temperature sensor measures an outlet temperature of an exhaust gas downstream from a particulate filter. The temperature estimation module estimates a highest temperature of the particulate filter based on the outlet temperature. The exhaust condition adjustment module controls regeneration based on the highest temperature of the particulate filter.

A method of regenerating a particulate filter includes: measuring an outlet temperature of an exhaust gas downstream from the particulate filter; estimating a highest temperature of the particulate filter based on the outlet temperature; and controlling regeneration of the particulate filter based on the estimated highest temperature.

In one feature, the highest temperature is estimated based on:

$$T_b = \frac{T_2 - T_0 \frac{F\alpha}{mC_p} + \frac{M_c C_{pb}}{mC_p} \frac{dT_2}{dt}}{1 - \frac{F\alpha}{mC_p}}$$

wherein $T_b$ is the highest temperature, $T_2$ is the outlet temperature of the exhaust gas, m is exhaust mass flow rate, $M_c$ is catalyst brick mass, $C_{pb}$ is a specific heat of catalyst brick, $C_p$ is a specific heat of exhaust gas, F is a heat transfer area between the exhaust gas and the emission reduction device, $\alpha$ is heat transfer coefficient, and $T_0$ is an ambient temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
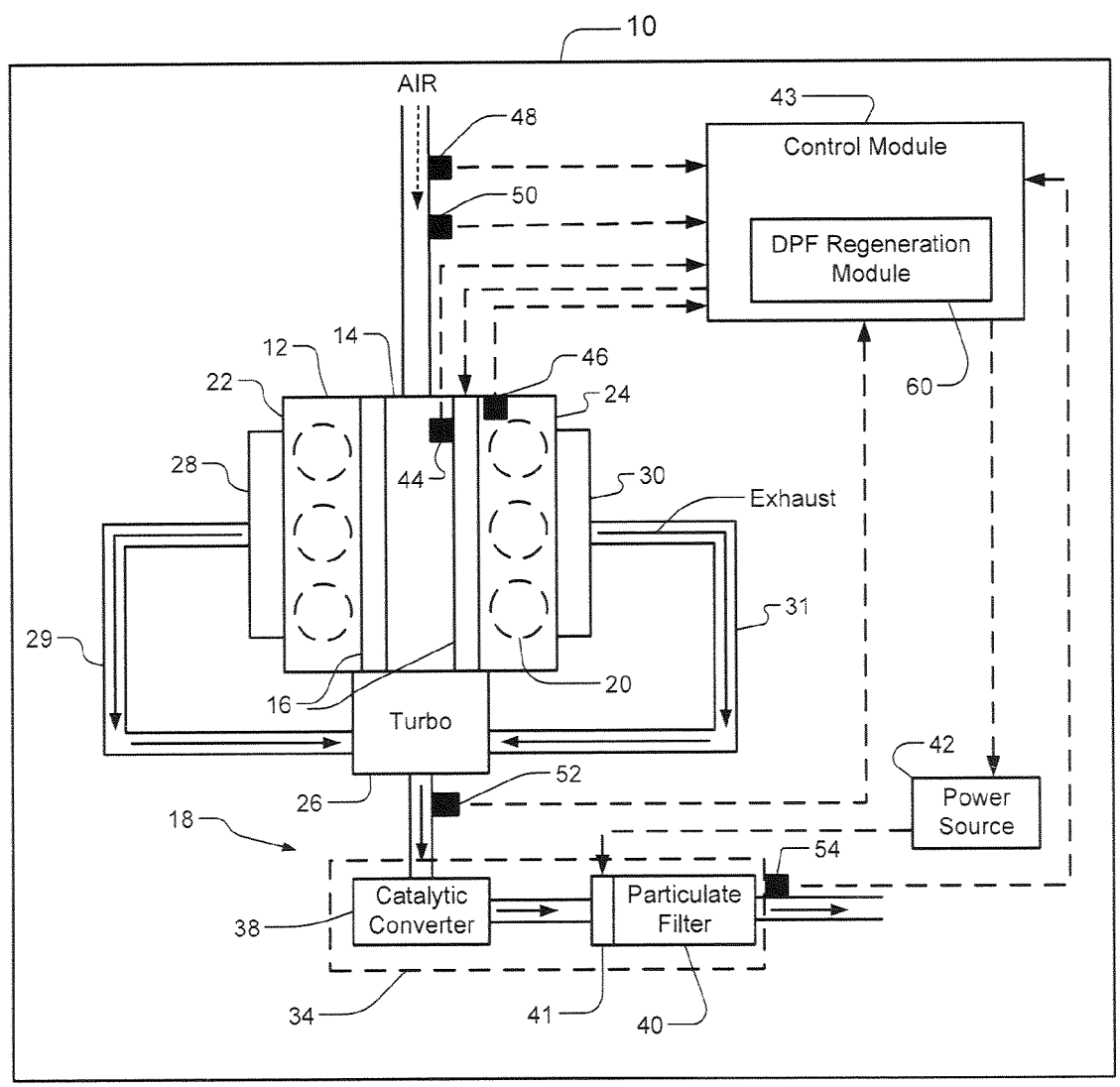
FIG. 1 is a functional block diagram of an exemplary diesel engine system that includes a particulate filter regeneration module according to the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A particulate filter regeneration system and method in accordance with the teachings of the present disclosure estimates a temperature at a rear face of a catalyst brick of a particulate filter. The temperature at the rear face of the catalyst brick of the particulate filter may be representative of a highest temperature of the particulate filter. The temperature is estimated based on an outlet temperature of the exhaust gas downstream from the particulate filter, engine operating parameters, and design specifications of the particulate filter. The regeneration process of the particulate filter is controlled based on the estimated highest temperature of the particulate filter to avoid thermal damage to the catalyst bricks of the particulate filter.

Referring now to FIG. 1, an exemplary engine system 10 includes an engine 12, an intake manifold 14, a common rail fuel injection system 16 and an exhaust system 18. The engine 12 may be a gasoline engine or a diesel engine. The exemplary engine 12 includes six cylinders 20 configured in adjacent cylinder banks 22, 24 in V-type layout. Although FIG. 1 depicts six cylinders, it can be appreciated that the engine 12 may include additional or fewer cylinders 20. For example, engines having 2, 4, 5, 8, 10, 12 and 16 cylinders are contemplated. It is also anticipated that the diesel engine 12 may have an inline-type cylinder configuration.

Air is drawn into the intake manifold 14 through a throttle (not shown). Air is drawn into the cylinders 20 from the intake manifold 14 and is compressed therein. Fuel is injected into the cylinder 20 by the common rail injection system 16. When the engine 12 is a diesel engine, the heat of the compressed air ignites the air/fuel mixture. When the engine 12 is a gasoline engine, the air/fuel mixture is ignited by a spark plug (not shown). The exhaust gases are exhausted from the cylinders 20 and into the exhaust system 18. In some instances, the engine system 10 can include a turbocharger 26 that pumps additional air into the cylinders 20 for combustion with the fuel and air drawn in from the intake manifold 14.

The exhaust system 18 includes exhaust manifolds 28, 30, exhaust conduits 29 and 31, and an emission reduction device 34. The emission reduction device 34 may include a catalytic converter 38 and/or a particulate filter 40 and/or a selective catalytic reduction (SCR) converter (not shown). The catalytic converter 38 may be, for example, a three-way catalytic converter (TWC), an oxidation catalyst, a diesel oxidation catalyst (DOC), or a lean NO$_x$ trap (LNT). The particulate filter 40 may be a diesel particulate filter (DPF). The SCR converter may be provided upstream or downstream from the particulate filter 40.

An electrical heater 41 may be provided upstream from or integrated with the particulate filter 40. First and second exhaust segments are defined by the first and second cylinder banks 22 and 24. The exhaust manifolds 28 and 30 direct the exhaust segments from the corresponding cylinder banks 22 and 24 into the exhaust conduits 29 and 31. The exhaust is directed into the turbocharger 26 to drive the turbocharger 26. A combined exhaust stream flows from the turbocharger 26 through the catalytic converter 38 and the heater 41 to the particulate filter 40. The particulate filter 40 filters particulates from the combined exhaust stream as it flows to the atmosphere.

The particulate filter 40 is periodically regenerated to remove particulates collected in the particulate filter 40. During regeneration, a power source 42 supplies power to the electrical heater 41 to heat the exhaust stream flowing therethrough, which in turn heats the particulate filter 40. As such, the diesel particulates on the surface of the catalyst of the particulate filter 40 are burned off. The electrical heater 41 may also heat the particulate filter 40 directly when the electrical heater 41 is integrated with the particulate filter 40 or is provided adjacent to the particulate filter 40. In addition to the heat from the electrical heater 41, exothermic heat released from oxidization of HC in the catalytic converter 38 also contributes to the increased temperature of the particulate filter 40. Combustion of the diesel particulates inside the particulate filter 40 also releases heat to the surface of the catalyst in the particulate filter 40. Therefore, a non-uniform temperature distribution exists over the surface of the catalyst bricks of the particulate filter 40. The highest temperature of the catalyst bricks occurs at a rear surface of the catalyst bricks.

A control module 43 regulates operation of the engine system 10 according to signals from a plurality of sensors. The plurality of sensors include, but are not limited to, an intake manifold absolute pressure (MAP) sensor 44, an engine speed sensor 46, an intake air temperature (IAT) sensor 48, a mass air flow (MAF) sensor 50, and a temperature sensor 54. The MAP sensor 44 measures the air pressure within the intake manifold 14. The engine speed sensor 46 measures engine speed (RPM). The IAT sensor 48 measures the ambient air temperature. The mass air flow sensor 50 measures the mass flow rate of the air that enters the intake manifold 14.

The temperature sensor 54 is provided downstream from the emission reduction device 34 and measures a temperature of the exhaust gas that leaves the emission reduction device 34. When the emission reduction device 34 includes a particulate filter 40 and estimating temperature of the particulate filter is desirable, the temperature sensor 54 may be provided at an outlet of the particulate filter 40. When the emission reduction device 34 includes a catalytic converter 38 and estimating temperature of the catalytic converter 38 is desirable, the temperature sensor 54 may be provided at an outlet of the catalytic converter 38. The temperature sensor 54 may be a thermistor.

The control module 43 includes a particulate filter regeneration module 60 that estimates a temperature at the rear face of the catalyst bricks of the particulate filter 40. The temperature at the rear face of the catalyst bricks of the particulate filter 40 may be representative of a highest temperature of the particulate filter 40. The particulate filter regeneration module 60 controls the particulate filter regeneration process based on the estimated highest temperature of the particulate filter 40.

Figure 2:
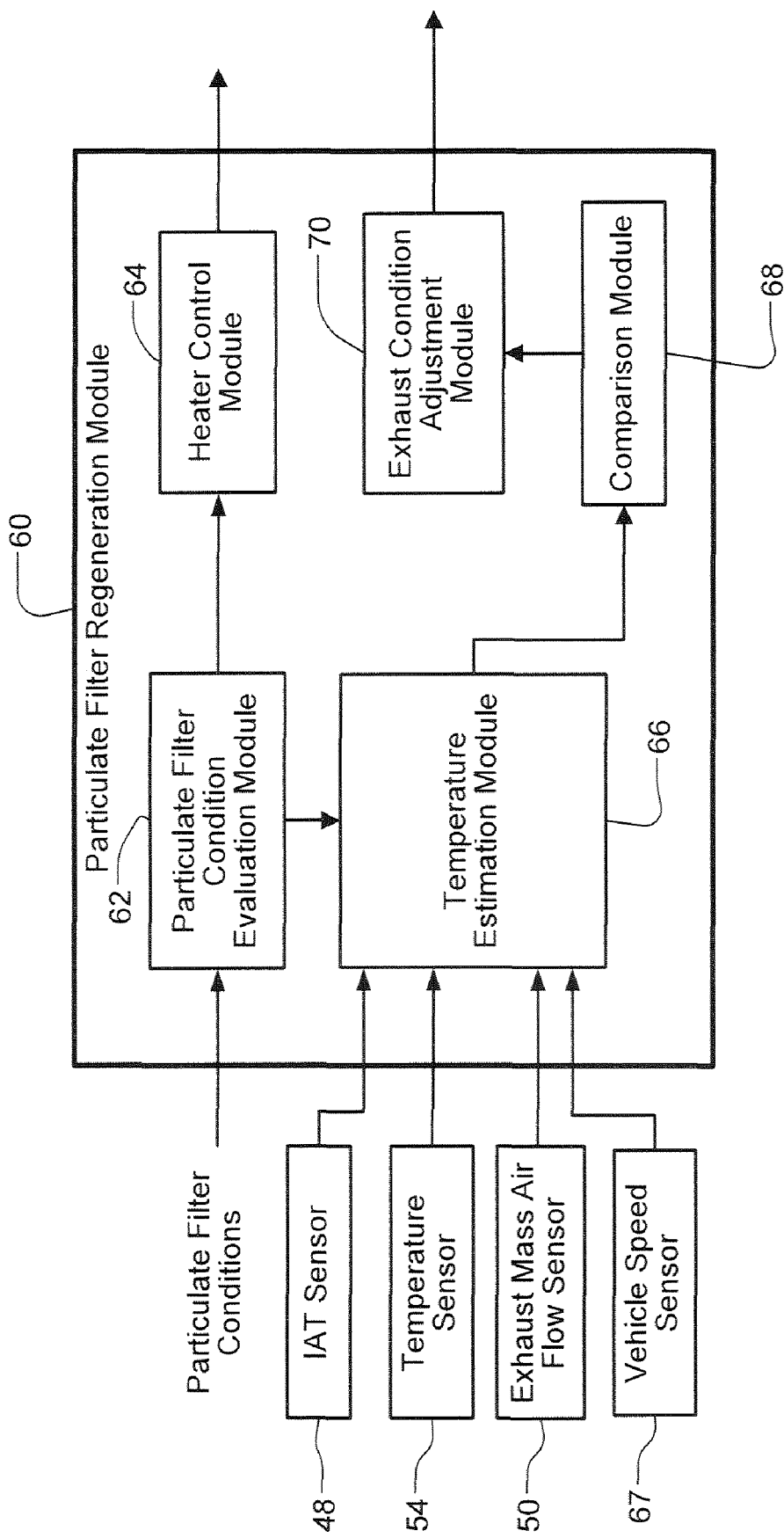
FIG. 2 is a schematic functional diagram of a particulate filter regeneration module according to the present disclosure.

Referring to FIG. 2, the particulate filter regeneration module 60 includes a particulate filter condition evaluation module 62, a heater control module 64, a temperature estimation module 66, a comparison module 68, an exhaust condition adjustment module 70, and an exhaust mass flow rate estimation module 72. The particulate filter regeneration module 60 initiates regeneration of the particulate filter 40 and continuously monitors the regeneration process to ensure that the temperature of the particulate filter 40 is within an acceptable range.

More specifically, the particulate filter condition evaluation module 62 evaluates particulate filter conditions and determines whether an enablement condition for regeneration is present. An enablement condition may be present, for example only, when a loading of the particulate filter 40 exceeds a threshold or when a difference between the exhaust gas pressures upstream and downstream from the particulate filter 40 exceeds a threshold pressure. When the enablement condition is present, the heater control module 64 activates the electrical heater 41 to heat the exhaust gas that passes through the electrical heater 41. The heated exhaust gas then heats the particulate filter 40 as it flows through the particulate filter 40 to start regeneration. The duration of the regeneration process varies based upon the amount of diesel particulates within the particulate filter 40. The electrical heater 41 may be turned on only for an initial period of the regeneration process. After the regeneration process is started, the electrical heater 41 may be turned off. The regeneration process continues using heat released from combustion of the particulates.

Alternatively, instead of using the electrical heater 41, the regeneration process may be initiated by injecting more fuel to the cylinders. For example only, fuel may be injected at a late stage of the expansion stroke. When the catalytic converter 38 includes a diesel oxidation catalyst (DOC), the fuel may be injected into the exhaust pipe upstream from the DOC. Excess fuel may be combusted in the DOC to increase the exhaust temperature, causing combustion of the diesel particulates.

The exhaust mass flow rate estimation module 72 communicates with the MAF sensor 50 and a fuel flow estimation module 74. The MAF sensor 50 measures the mass flow rate of fresh air. The fuel flow estimation module 74 estimates fuel flow rate injected into the cylinders based on the commanded fueling. The exhaust mass flow rate estimation module 72 estimates the mass flow rate of the exhaust gas based on the mass flow rate of fresh air and the fuel flow. For example, the mass flow rate of the exhaust gas may be a sum of the mass flow rate of fresh air and the fuel flow rate.

During regeneration, the temperature estimation module 66 continuously estimates the highest temperature of the particulate filter 40. The estimated highest temperature of the particulate filter 40 occurs at the rear face of the catalyst bricks (i.e., the brick temperature). The temperature estimation module 66 receives signals from a plurality of sensors and estimates the highest brick temperature based on these signals and design specifications of the particulate filter 40.

The estimated highest temperature may be determined based on the following equation:

$$T_b = \frac{T_2 - T_0 \frac{F\alpha}{mC_p} + \frac{M_c C_{pb}}{mC_p} \frac{dT_2}{dt}}{1 - \frac{F\alpha}{mC_p}}$$

wherein $T_b$ is estimated highest temperature (i.e., brick temperature);

$T_2$ is an outlet temperature of the exhaust gas that is measured at an outlet of the particulate filter;

m is an exhaust mass flow rate;

$M_c$ is a catalyst brick mass;

$C_{pb}$ is a specific heat of catalyst brick;

$C_p$ is a specific heat of exhaust gas;

F is a heat transfer area between the exhaust gas and the particulate filter;

α a is heat transfer coefficient; and $T_0$ is an ambient temperature.

Parameters that are relevant to estimation of the highest temperature of the particulate filter 40 include exhaust mass flow rate, outlet temperature of the exhaust gas downstream from the particulate filter 40, catalyst brick mass, specific heat of catalyst brick, specific heat of the exhaust gas, heat transfer area between the exhaust gas and the particulate filter 40, heat transfer coefficient, and ambient temperature.

The ambient temperature, and the outlet temperature of the exhaust gas downstream from the particulate filter 40 are measured by existing sensors. The ambient temperature is the intake air temperature and is measured by the IAT sensor 48. The outlet temperature is measured by the temperature sensor 54. The exhaust mass flow rate is estimated by the exhaust mass flow rate estimation module 72. Heat transfer coefficient is a function of vehicle speed and can be calculated based on a vehicle speed that is measured by a vehicle speed sensor (not shown). The catalyst brick mass, specific heat of the exhaust gas and heat transfer area can be obtained from design specifications of the particulate filter 40.

The comparison module 68 compares the estimated (highest) temperature of the particulate filter 40 with an acceptable temperature range of the particulate filter 40. When the estimated temperature exceeds an upper limit of the acceptable temperature range, the exhaust condition adjustment module 70 may adjust the exhaust condition to lower the temperature of the particulate filter 40, for example only, by adjusting fueling to reduce fuel quantity of a fuel injection. When the temperature is below a lower limit of the acceptable temperature range, the exhaust condition adjustment module 70 may adjust fueling to increase fuel quantity of a fuel injection to increase the temperature of the particulate filter.

The estimated temperature of the particulate filter 40 allows the filter hardware to be protected from uncontrolled regeneration. If the estimated temperature exceeds a threshold, the control module may adjust the engine condition by increasing the exhaust flow rate or by reducing an oxygen concentration of the exhaust gas.

Figure 3:
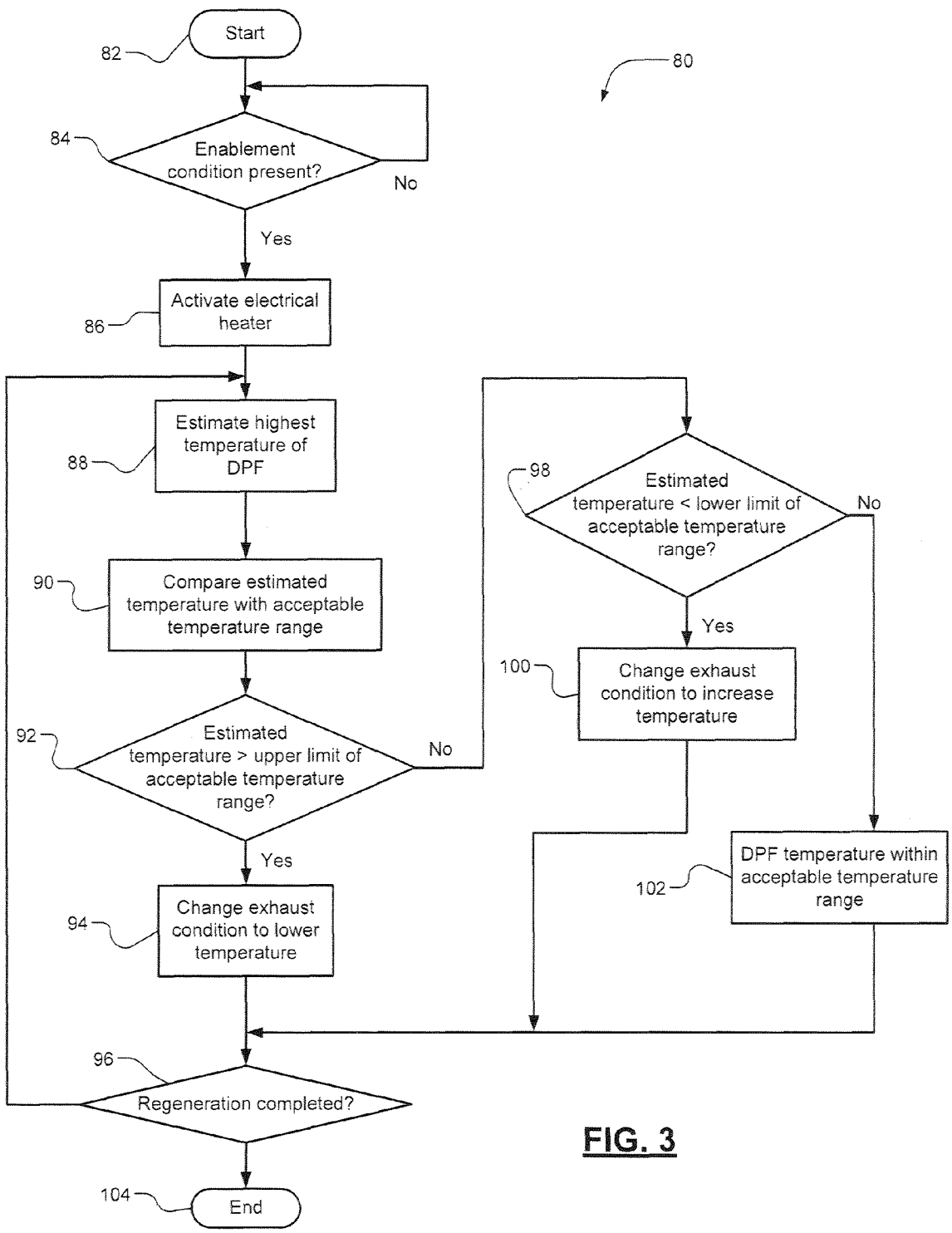
FIG. 3 is a flow diagram of a method for regenerating a particulate filter according to the present disclosure.

Referring now to FIG. 3, a method 80 for regenerating a particulate filter 40 starts in step 82. The particulate filter condition evaluation module 62 determines whether an enablement condition is present for particulate filter regeneration in step 84. When the enablement condition is not present, the method 80 returns to step 82 to continue monitoring. When the enablement condition is present, the electrical heater 41 is activated or excess fuel is injected to increase temperature of the exhaust gas in step 86. The temperature estimation module 66 estimates the highest temperature of the particulate filter 40 in step 88. The comparison module 68 compares the estimated highest temperature with an acceptable temperature range of the particulate filter 40 in step 90. When the estimated temperature exceeds an upper limit of the acceptable temperature range in step 92, the exhaust condition adjustment module 70 adjusts fueling to lower the temperature of the particulate filter 40 in step 94. The method 80 proceeds to step 96.

When the estimated temperature does not exceed the upper limit of the acceptable temperature range in step 92, the comparison module 68 determines whether the estimated temperature is below a lower limit of the acceptable temperature range in step 98. If the estimated temperature is below the lower limit of the acceptable temperature range, the exhaust condition adjustment module 70 changes engine parameters to increase the temperature in step 100. The method 80 proceeds to step 96.

If the temperature is not below the lower limit of the acceptable temperature range in step 98, the comparison module 68 determines that the temperature of the particulate filter 40 is within the acceptable temperature range in step 102. The method 80 proceeds to step 96. In step 96, the particulate filter condition evaluation module 62 determines whether the regeneration process is completed in step 96. If the regeneration process is not completed, the method 80 returns to step 88 to continue to monitor and estimate the highest temperature of the particulate filter 40. The continuous feedback of the highest temperature of the particulate filter 40 ensures real time control of the regeneration process. When the regeneration process is completed in step 96. The method 80 ends in step 104.

The particulate filter regeneration system of the present disclosure continuously monitors the highest temperature of the particulate filter 40. The temperature of the particulate filter 40 can be more precisely controlled to improve regeneration efficiency and to avoid thermal damage to the catalyst brick of the particulate filter 40. The highest temperature is estimated using existing sensors and known design specifications of the particulate filter 40. Moreover, the particulate filter regeneration system of the present disclosure uses only one temperature sensor downstream from the particulate filter 40 to estimate the temperature of the particulate filter 40. Therefore, manufacturing costs can be reduced.

While the temperature estimation module 66 has been described in connection with a particulate filter, the temperature estimation module 66 may be used with any types of emission reduction devices. For example, the temperature estimation module 66 may be used to estimate the highest temperature of a catalytic converter, an oxidation catalyst, a TWC, and an LNT. Similarly, only one temperature sensor at an outlet of any of the emission reduction devices is needed for temperature estimation. Similarly, the estimated highest temperature may be used for regeneration control of the emission reduction devices or any temperature related control.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust control system comprising:
a temperature sensor that measures an outlet temperature of an exhaust gas downstream of an emission reduction device;
a temperature estimation module that estimates a highest temperature of the emission reduction device based on the outlet temperature but not based on an inlet temperature of the exhaust gas upstream of the emission reduction device, and further based on an exhaust mass flow rate, a brick mass of a catalyst brick of the emission reduction device, a specific heat of the catalyst brick, a specific heat of the exhaust gas, and a heat transfer area between the exhaust gas and the emission reduction device; and
an exhaust condition adjustment module that controls operation of the exhaust control system based on the highest temperature of the emission reduction device.

2. The exhaust control system of claim 1 wherein the highest temperature is estimated based on:

$$T_b = \frac{T_2 - T_0 \frac{F\alpha}{mC_p} + \frac{M_c C_{pb}}{mC_p} \frac{dT_2}{dt}}{1 - \frac{F\alpha}{mC_p}}$$

wherein Tb is the highest temperature, T2 is the outlet temperature of the exhaust gas, m is the exhaust mass flow rate, Mc is the brick mass, Cpb is the specific heat of the catalyst brick, Cp is the specific heat of the exhaust gas, F is the heat transfer area, α is a heat transfer coefficient, and T0 is an ambient temperature.

3. The exhaust control system of claim 1 wherein the highest temperature of the emission reduction device is based on a temperature of a rear face of the catalyst brick of the emission reduction device.

4. The exhaust control of claim 1 wherein the emission reduction device includes at least one of a catalytic converter, a three-way catalytic converter, an oxidation catalyst, a diesel oxidation catalyst, a lean NOx trap, and a diesel particulate filter.

5. A regeneration system comprising:
a temperature sensor that measures an outlet temperature of an exhaust gas downstream of a particulate filter;
a temperature estimation module that estimates a highest temperature of the particulate filter based on the outlet temperature but not based on an inlet temperature of the exhaust gas upstream of the particulate filter, and further based on an exhaust mass flow rate, a brick mass of a catalyst brick of the particulate filter, a specific heat of the catalyst brick, a specific heat of the exhaust gas, and a heat transfer area between the exhaust gas and the particulate filter; and
an exhaust condition adjustment module that controls regeneration based on the highest temperature of the particulate filter.

6. The regeneration system of claim 5 wherein the highest temperature is estimated based on:

$$T_b = \frac{T_2 - T_0 \frac{F\alpha}{mC_p} + \frac{M_c C_{pb}}{mC_p} \frac{dT_2}{dt}}{1 - \frac{F\alpha}{mC_p}}$$

wherein Tb is the highest temperature, T2 is the outlet temperature of the exhaust gas, m is the exhaust mass flow rate, Mc is the brick mass, Cpb is the specific heat of the catalyst brick, Cp is the specific heat of the exhaust gas, F is the heat transfer area, α is a heat transfer coefficient, and T0 is an ambient temperature.

7. The regeneration system of claim 5 wherein the highest temperature of the particulate filter is based on a temperature of a rear face of the catalyst brick of the particulate filter.

8. The regeneration system of claim 5 wherein the exhaust condition adjustment module controls the regeneration by adjusting at least one of an exhaust flow rate and an oxygen concentration of the exhaust gas.

9. A method of regenerating a particulate filter comprising:
measuring an outlet temperature of an exhaust gas downstream of the particulate filter;
estimating a highest temperature of the particulate filter based on the outlet temperature but not based on an inlet temperature of the exhaust gas upstream of the particulate filter, and further based on an exhaust mass flow rate, a brick mass of a catalyst brick of the particulate filter, a specific heat of the catalyst brick, a specific heat of the exhaust gas, and a heat transfer area between the exhaust gas and the particulate filter; and
controlling regeneration of the particulate filter based on the estimated highest temperature.

10. The method of claim 9 wherein the highest temperature is estimated based on:

$$T_b = \frac{T_2 - T_0 \frac{F\alpha}{mC_p} + \frac{M_c C_{pb}}{mC_p} \frac{dT_2}{dt}}{1 - \frac{F\alpha}{mC_p}}$$

wherein Tb is the highest temperature, T2 is the outlet temperature of the exhaust gas, m the is exhaust mass flow rate, Mc is the brick mass, Cpb is the specific heat of the catalyst brick, Cp is the specific heat of the exhaust gas, F is the heat transfer area, α is a heat transfer coefficient, and T0 is ambient temperature.

11. The method of claim 9 further comprising adjusting at least one of an exhaust flow rate and an oxygen concentration of the exhaust gas to control the regeneration.

* * * * *